UNITED STATES PATENT OFFICE.

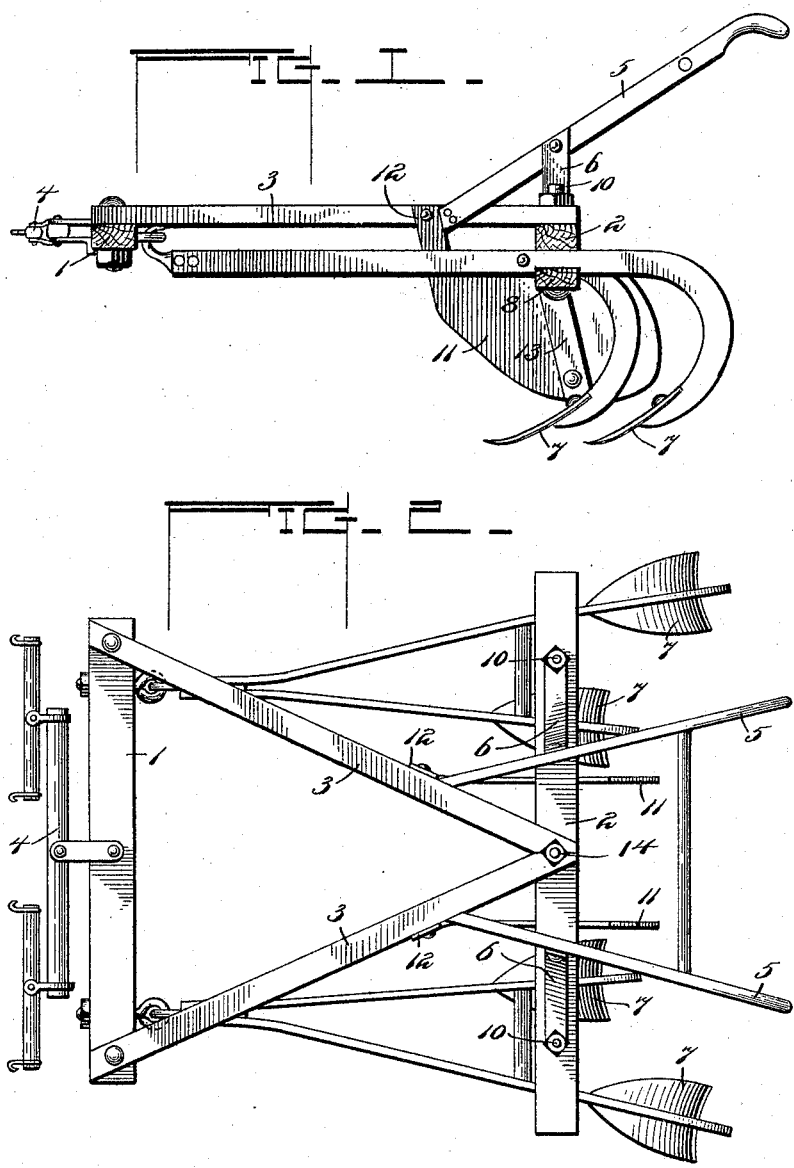

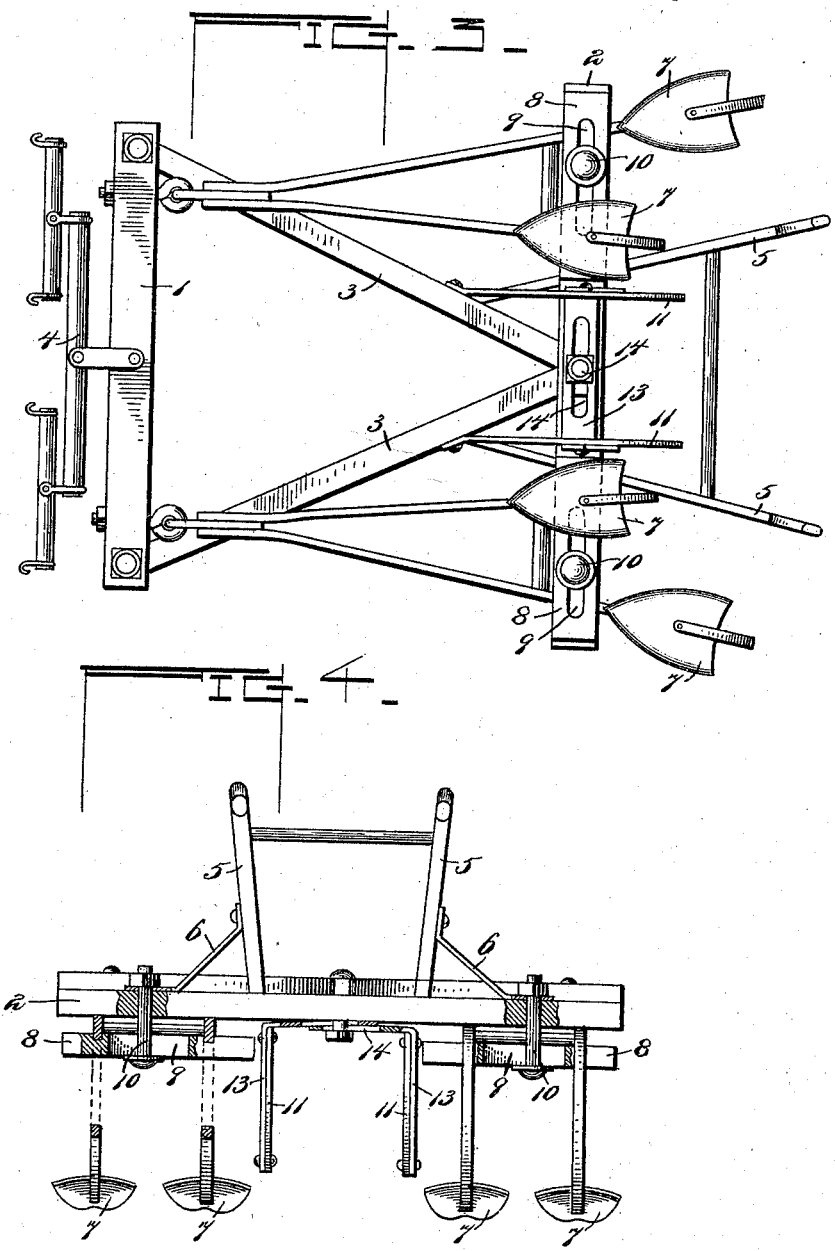

WARREN W. MARTIN AND WARREN D. KING, OF EDDYVILLE, KENTUCKY.

PLOW OR CULTIVATOR.

SPECIFICATION forming part of Letters Patent No. 585,685, dated July 6, 1897.

Application filed February 24, 1897. Serial No. 624,797. (No model.)

*To all whom it may concern:*

Be it known that we, WARREN W. MARTIN and WARREN D. KING, citizens of the United States, residing at Eddyville, in the county of Lyon and State of Kentucky, have invented a new and useful Plow or Cultivator, of which the following is a specification.

The primary object of this invention is to reduce the expense of tilling the soil and to obviate the provision of a great number of implements for plowing and cultivating, as it enables two plows of ordinary construction to be combined in such a manner as to form a cultivator when required, the plows being laterally adjustable to vary the width of the cultivator according to the distance apart of the rows to be treated. Fenders are combined with the implement and are shiftable laterally according to the size and growth of the plants to obviate injury thereto when the implement is drawn over the field.

Other objects and advantages are contemplated and will appear as the nature of the invention is fully understood; and to this end reference is to be had to the accompanying drawings and the following description, in which corresponding and like parts are referred to and designated by the same reference-characters.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of an agricultural implement constructed in accordance with this invention. Fig. 2 is a top plan view thereof. Fig. 3 is a view of the implement inverted. Fig. 4 is a rear view, parts being broken away.

The frame comprises a front bar 1, a rear bar 2, parallel with the front bar, and braces 3, the latter secured at their front ends to the terminals of the bar 1 and converging toward their rear ends and secured to the rear bar 2 at a point intermediate of its ends. The front bar 1 and braces 3 constitute a frame of triangular form having its base portion at the front of the implement and its apex at the rear. A doubletree 4 is applied in the usual manner to the bar 1, and the team for drawing the implement over the field is hitched thereto. The handles 5 are secured at their lower ends to the rear portions of the braces 3 and are strengthened by braces 6, which are attached at their upper ends to the handles and diverge at their lower ends, which are attached to the end portions of the bar 2.

The plows 7 are of the type comprising a series of beams arranged in gangs and bearing shovels at their active ends of suitable pattern, according to the nature of the work to be performed, and these plows have loose connection at their front ends with the terminal portions of the bar 1, so as to admit of their rear ends being separated or brought closer together, as required. A clamp-bar 8 is had for each gang or plow and is notched in its upper side to receive the beams, so as to make positive engagement therewith, and these clamp-bars have longitudinal slots 9, through which pass bolts 10 to secure the plows in an adjusted position. These bolts 10 also serve to fasten the lower ends of the braces 6. The longitudinal slots 9 admit of the clamp-bars being moved along the rear bar 2 upon loosening the bolts 10, and when the desired adjustment has been effected the plows are secured by retightening the bolts 10.

Fenders 11, consisting of plates, have shanks 12 at their front ends connected to the braces 3, and brackets 13 have their vertical portions secured to the plates near their rear ends, and have their horizontal portions overlapping and longitudinally slotted to receive a bolt 14, by means of which the fenders are secured to the rear bar 2 in an adjusted position. This bolt 14 is utilized for connecting the braces 3 or the rear end of the triangular frame with the bar 2. Upon loosening the bolt 14 or the nut thereof the fenders can be spread or brought closer together, as required, the adjustment being independent of the plows, thereby adapting the space between them to the growth of the plants to be cultivated.

A frame built substantially as herein set forth can be cheaply constructed and admits of ordinary gang-plows being coupled in such manner as to provide a cultivator, thereby avoiding the necessity of providing a special implement for cultivating purposes, and one person can do the work generally requiring two to accomplish where the plows are used separately.

Having thus described the invention, what is claimed as new is—

1. In an agricultural implement, the combination of front and rear bars extending in parallel relation, braces having connection at their front ends with the extremities of the front bar and converging at their rear ends and secured together and to the rear bar at a middle point, plows having loose connection at their front ends with the end portions of the front bar and having adjustable connection at their rear ends with the terminal portions of the rear bar, handles having connection with the rear portions of the said braces, and braces 6 connecting the handles with the aforesaid rear bar, whereby the component parts of the frame are braced and strengthened, substantially as set forth.

2. In an agricultural implement, the combination of front and rear bars, braces connecting the said bars and converging at their rear ends, handles having connection with the braces, other braces interposed between the handles and the rear bar, plows having loose connection with the front bar, longitudinally-slotted clamp-bars receiving the rear portions of the beams comprising the plows, means for adjustably connecting the clamp-bars with the rear bar, fenders having connection with the converging braces, brackets applied to the fenders and having their horizontal portions slotted and overlapping, and a fastening for adjustably connecting the overlapping parts of the said brackets with the rear bar, substantially in the manner and for the purpose set forth.

In testimony that we claim the foregoing as our own we have hereto affixed our signatures in the presence of two witnesses.

WARREN W. MARTIN.
WARREN D. KING.

Witnesses:
W. L. CRUMBAUGH,
G. H. COLLAMER.